United States Patent [19]

Andriessen

[11] Patent Number: 4,612,789

[45] Date of Patent: Sep. 23, 1986

[54] MAKING RINGS FROM TUBE OR BAR STOCK

[75] Inventor: Ronald C. Andriessen, Cheltenham, England

[73] Assignee: Formflo Limited, Gloucester, England

[21] Appl. No.: 636,007

[22] Filed: Jul. 30, 1984

[30] Foreign Application Priority Data

Aug. 3, 1983 [GB] United Kingdom ............... 8320885

[51] Int. Cl.$^4$ ............................................. B21H 1/06
[52] U.S. Cl. ........................................... 72/71; 29/417
[58] Field of Search ............... 72/70, 71, 72; 29/417, 29/DIG. 15

[56] References Cited

U.S. PATENT DOCUMENTS

| | | | |
|---|---|---|---|
| 819,844 | 5/1906 | Briede | 29/417 |
| 1,839,909 | 1/1932 | Weatherhead, Jr. | 29/417 |
| 3,756,055 | 9/1973 | Marcovitch | 72/71 |
| 3,883,943 | 5/1975 | Dietzen | 29/417 |
| 4,302,958 | 12/1981 | Andriessen et al. | 72/71 |

FOREIGN PATENT DOCUMENTS

| | | | |
|---|---|---|---|
| 6891 | 2/1972 | Japan | 72/71 |
| 153266 | 4/1963 | U.S.S.R. | 72/71 |

*Primary Examiner*—Lowell A. Larson
*Attorney, Agent, or Firm*—Christie, Parker & Hale

[57] ABSTRACT

Rings are made from tube stock (10) or bar stock by cold rolling successive end portions (78) of the latter between profile rolling elements (42, 44) of a plurality of rollers which also include parting tool elements (40) for making a parting groove, also by cold rolling. The parting groove is formed, by the parting tool elements while the profile rolling operation takes place during the latter part of the parting groove forming operation. With bar stock, a bore is made through the end portion of the stock, e.g. after the parting groove is formed, the latter having a depth just insufficient for final parting-off, which takes place during subsequent machining of the bore of the ring. A locating groove (76, 80) is also formed, by means of a grooving tool (74), simultaneously with the rolling operation.

12 Claims, 11 Drawing Figures

MAKING RINGS FROM TUBE OR BAR STOCK

This invention relates to methods and apparatus for making a succession of rings from tube or cylindrical bar stock (hereinafter called "stock" in contexts applicable to both tube and bar), such method including:

(1) supporting the stock on a central axis and effecting relative rotation about the central axis as between the stock and a parting tool element, for forming a circumferential parting groove in the stock by cold rolling, the parting tool element being capable of limited, controllable axial movement, whilst (2) advancing the parting tool element in a direction into engagement with the stock to form the said parting groove therein and to define an end portion of the stock extending from the parting groove to a free end of the stock, but without completing severance of the end portion;

(3) subsequently completing severance of the end portion to constitute a said ring;

(4) radially retracting the parting tool element when it has finished operating on the stock; and (5) axially feeding the stock forward by a predetermined amount ready for making the next ring.

Such a method will be referred to in this specification as a "method of the kind hereinbefore specified".

The expression "apparatus of the kind hereinbefore specified" will similarly be used in this specification to denote apparatus, suitable for carrying out a method of the above kind, and including: means for supporting stock protruding therefrom on a central axis; a rolling tool comprising a parting tool element, for forming a parting groove in the stock by cold rolling, the parting tool element being mounted for limited, controllable axial movement, the parting tool element being further arranged to be movable in a generally radial direction into and away from the stock so supported, the said means for supporting the stock, and the rolling tool, being arranged for relative rotation about the central axis, and means being provided for completing severance of the end portion (as already defined above) after the associated circumferential parting groove has been formed in the stock by the parting tool element; and means whereby the stock can be advanced axially by successive predetermined increments.

Apparatus and methods of these kinds, using tube stock, are described in our United Kingdom Patent Specifications Nos. GB-1535562 and GB-2038213A, and consist of machines for preparing rings in the form of annular workpieces for subsequent working, for example to be formed into races for rolling bearings. Processes for performing such subsequent working, by profile rolling, i.e. by re-forming the workpiece to its required profile by cold rolling, are described in our United Kingdom Patent Specifications Nos. GB-1329521, GB-1378508, GB-1384387, GB-1384388, GB-1395726, GB-1475777, GB-1475778, GB-1475779 and GB-1475780.

The workpieces produced by the methods disclosed in the aforementioned Specifications Nos. GB-1535562 and GB-2038213A are in the form of cylindrical rings having each of their end faces in the shape of a frustum of a shallow cone. This is achieved by virtue of the V-shaped profile of the parting tool element, which consists of a relatively thin roller. Although there is provision for machining the bore of the ring to the required diameter, and also for forming local chamfers on the various sharp edges of the metal by means of conventional cutting tools, the workpieces under discussion retain the cylindrical external surface of the stock from which they have been made. This surface (and indeed, if required, the end faces also) is re-formed by profile rolling, in one or more subsequent stages and on a corresponding number of machines.

Thus, at least two machines are conventionally required, viz. a blank preparation machine which makes a succession of the workpieces (or blanks) from the stock, and one or more profile rolling machines on which the profiled rings are made from the blanks. Such machinery is relatively expensive in capital cost, and also calls for the allocation of shop floor space for both or all of the machines, as well as for the conveyor or the like which may be provided for the purpose of effecting transfer of the blanks from the blank preparation machine to the profile rolling machine or machines, and between each of the latter and the next in cases where there is more than one profile rolling stage. In addition, the machines all of course incur maintenance costs and use significant amounts of energy.

It is an object of the present invention to reduce or eliminate the requirement for a plurality of separate machines for the manufacture of profiled cold-rolled rings such as bearing races or rollers.

According to the invention, in a first aspect, a method of the kind hereinbefore specified includes the step of cold rolling the outer circumferential surface of the end portion of the stock, whilst the parting tool element is being advanced into the stock, by means of a profiled rolling tool surface, axially adjacent to, and moving with, the parting tool element, so as to deform the said outer surface of the stock into conformity with the profile of the rolling tool surface.

By this means, the profile rolling operation is performed on the workpiece simultaneously with that of forming the parting groove. The method of the invention may alternatively be regarded as eliminating the formation of a workpiece or blank as an intermediate element in the process of forming profiled rings from stock, in that the profiled rings are formed in succession by operating directly upon the stock.

It will be realised that, in conventional or known methods of making profiled rings from tube stock, in which a workpiece or blank is first made, the blank subsequently being re-formed to the required final profile in an entirely separate machine, the method by which the first of these stages is carried out does not in general affect the method chosen for the second stage. Thus, for example, in the preparation of a blank for subsequent profile rolling, the method used may comprise a conventional turning, i.e. cutting, operation for the purpose of parting the workpiece from the tube stock. Conversely, the "roll parting" method of making the workpieces, as disclosed in our aforementioned Specifications Nos. GB-1535562 or GB-2038213A, may be followed by shaping of the workpieces by a conventional cutting or grinding process to form the finished articles, rather than by a roll forming process involving cold rolling. The method of the present invention in no way eliminates the option of using such other methods to finish the articles; if desired, the profiled rings produced by this method can be subjected in a subsequent machine, or in subsequent machines, to suitable operations of turning, grinding, electrochemical or spark erosion, or any other desired process for removing metal. Indeed, the rings may be further reformed by cold rolling in one or more separate machines, if required.

However, it will be seen that in some cases the need for a subsequent operation on a costly profile rolling or other machine is eliminated by performing the profiling operation on the stock itself; whilst in those cases in which more than one machine is necessary for making the finished component starting with the original stock from which the blank is made, the number of such machines may be reduced by one, with all of the attendant advantages.

Cold rolling is recognised as being a particularly accurate method of forming a profile, particularly where (for example) it is employed in the production of a spherical surface on the ring. The method of the invention combines the advantage that wastage of material is reduced with the further advantage of the accuracy that results from cold rolling, besides of course the elimination of a separate machine as already discussed above. As to reduction in wastage of material, there is substantially no loss of metal in the operation of parting the ring from the stock (such as is normally associated with other methods such as turning), whilst no material is lost in producing the final outside profile of the ring by rolling. By way of example, it has been found that, using the method of this invention, 320 components, each 12 mm in length, can be produced from a four-meter length of tube stock. If conventional cutting methods were used, the equivalent number of components produced would be only 256.

Thus, where tube stock is used, there is reduced material wastage. However, it may be preferred to use bar stock instead of tube. Accordingly, the method of the invention may be performed on bar stock; it then includes the step of forming, subsequent to step (1), and preferably though not necessarily subsequent to step (2), a bore through the end portion of the stock. This additional step is repeated for each increment of the stock, i.e. for each profiled ring made, and is preferably carried out by a simple drilling operation. Although this involves considerable loss of material as scrap, the disadvantage of such loss in terms of material cost may be more than offset by the substantially lower cost of bar stock as compared with tube stock of the same size. This tends to be the case with the smaller sizes of stock; hence bar stock may be preferred for the production of relatively small profiled rings.

Reverting to the method itself, according to a preferred feature of the invention the parting groove is partly formed before the commencement of engagement of the rolling tool surface with the outer circumferential surface of the end portion, and whilst the end portion is urged by the parting tool element axially forward until its free end engages an end stop surface in readiness for the said engagement. To this end, the method is preferably formed in apparatus wherein the parting tool element and the rolling tool surface are integral parts of the same tool member which also includes a flange portion of which a flank defines the end stop surface.

Our abovementioned Specification GB-2028213A describes an improved method of preparing annular blanks from tube stock, whereby the length of each of the blanks can be closely controlled. This results in substantial identity between the dimensions of each blank and those of the next. It is advantageous to extend the same principle to the method of the present invention.

Accordingly, in preferred embodiments of the method of this invention, a grooving tool is advanced in a generally radial direction simultaneously with the parting tool element, to form on the stock a substantially V-shaped, circumferential locating groove spaced axially from the parting groove by a predetermined distance, with the parting groove lying between the locating groove and the end portion of the stock, the stock in step (5) being fed forward by an amount approximately equal to said predetermined distance so that the locating groove lies opposite the parting tool element, the latter being guided by the locating groove, at the commencement of its next advance into the stock, so as to be in exact register with the locating groove.

Preferably, the initial engagement of the grooving tool with the stock takes place no earlier than the engagement of the free end of the stock with the end stop surface.

According to the invention, in a second aspect, apparatus of the kind hereinbefore specified includes a profile rolling tool element having a tool surface axially adjacent to the parting tool element and arranged to be movable therewith in both the axial and generally-radial directions, the said tool surface being profiled for cold rolling the outer circumferential surface of the end portion of the stock into conformity therewith.

It has been mentioned above that the parting groove is preferably partly formed before the commencement of engagement of the ring rolling tool surface with the outer circumferential surface of the end surface, whilst the end portion is urged forward to engage a stop surface. This takes place of course whilst the end portion is still attached to the remainder of the stock, so that its forward movement consists in the deformation of the part of the end portion nearest the parting tool element, in such a way as to cause the annular portion of the end portion disposed axially between the parting groove and the stop surface to become progressively displaced axially towards the stop surface. Apparatus in accordance with the invention is accordingly preferably adapted for this purpose in that the tool surface of the rolling tool element is spaced radially farther from the central axis than is the parting tool element. Thus, when the tool elements are advanced together towards the central axis, with the stock supported on the latter radially opposite the tool elements, the parting tool element will engage the stock before the ring rolling tool element does. The apparatus then further includes an end stop surface, disposed for engagement by the free end of the end portion of the stock as the end portion is urged axially forward by the parting tool element before being engaged by the said tool surface of the rolling tool element.

The parting tool element and the rolling tool surface are preferably parts of the same unitary tool member, having the end stop surface defined on a flank of a flange portion of the rolling tool element, so that the latter consists of a single, appropriately profiled roller. However, it is to be understood that the end stop, or the rolling tool element, or both, may be separate members from the parting tool element. Where the tool member is unitary, the parting tool element preferably has a surface, on the side thereof nearest to the rolling tool element, which is continuous with the profiled rolling tool surface and constitutes part of the latter. Thus as great a proportion of the total exterior surface of the end portion as desired can be formed to the required shape and dimensions in a single operation directly on the stock.

In preferred embodiments, the unitary tool member in the form of a roller is rotatable about its axis which is parallel to the central axis, in a carrier movable radially towards and away from the central axis, the roller as a whole being mounted for the said limited, controllable axial movement.

Since an external profile rolling operation is involved in the method of the present invention, means must be provided for supporting the end portion of the stock in such a manner as to provide a reaction force against the forces imposed on the end portion of the stock by the tooling. The most convenient means for this purpose are provided by arranging a plurality of said unitary rollers, disposed around the central axis and movable together for simultaneous operation on the end portion of the stock. There may for example be two or three unitary rollers, arranged at equal spacings around the central axis.

In the preferred embodiments of the apparatus, a grooving tool element, operating as discussed above, is provided, and the tool head (or one of the tool heads in cases where there is more than one unitary roller), is movable radially with respect to the central axis; the tool head here comprises a body together with the parting and rolling tool elements and the grooving tool element, the latter being separated by a predetermined axial distance from the parting tool element on the opposite side of the latter from the rolling tool element; whilst the tool elements are all rotatable together in the body about a common tool axis and are mounted for limited axial movement with respect to the means whereby the stock is supported; and the grooving tool element has a working surface with a substantially V-shaped profile. The grooving tool element has a diameter which is greater than the smallest diameter of the rolling tool surface, and substantially smaller than the diameter of the parting tool element.

In the description which follows, two embodiments of a method and apparatus according to the invention will be described, by way of example only, and compared with a method or apparatus of the prior art, with reference to the drawings of this specification, in which:

FIG. 2 shows a length of tube stock positioned in relation to the tool ready for a first ring to be formed, FIGS. 3 to 5 being views similar to FIG. 2 and showing, respectively, three subsequent stages in the manufacture of a profiled ring;

Figure 3:
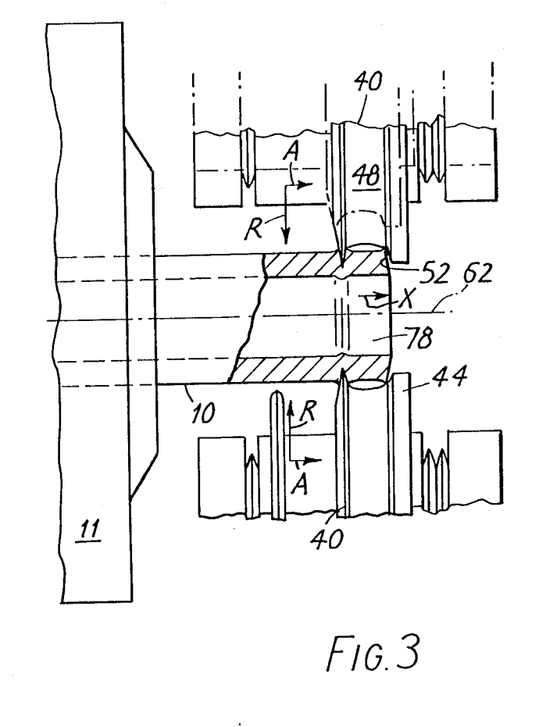
FIG. 3 shows an early stage during the formation of the ring whilst a parting groove is being formed.
Figure 4:
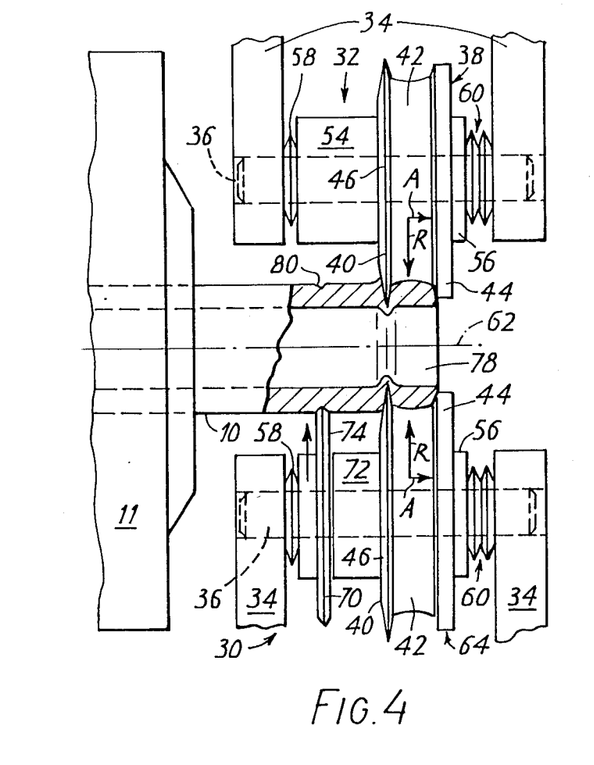
FIG. 4 shows the completion of the profile rolling operation.
Figure 5:
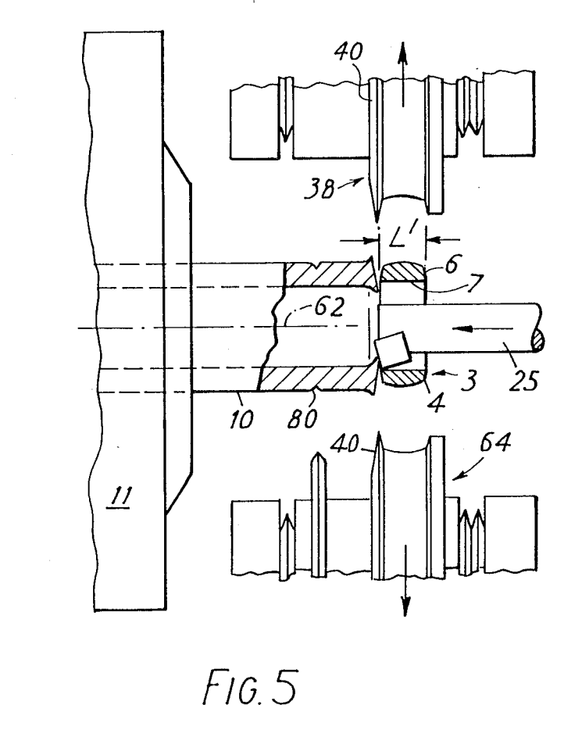
FIG. 5 shows the separation of the ring from the remainder of the tube stock.

The apparatus shown in FIGS. 2 to 5 is a profile rolling machine arranged to manufacture a succession of profiled bearing rings 3, one of which is indicated in FIG. 5, direct from steel tube stock 10. Each ring 3 is a profiled roller for a rolling bearing, and has a spherical outer circumferential surface 4, merging with frusto-conical end surface portions 6 surrounding a cylindrical bore 7 of the ring.

Figures 1, 6:
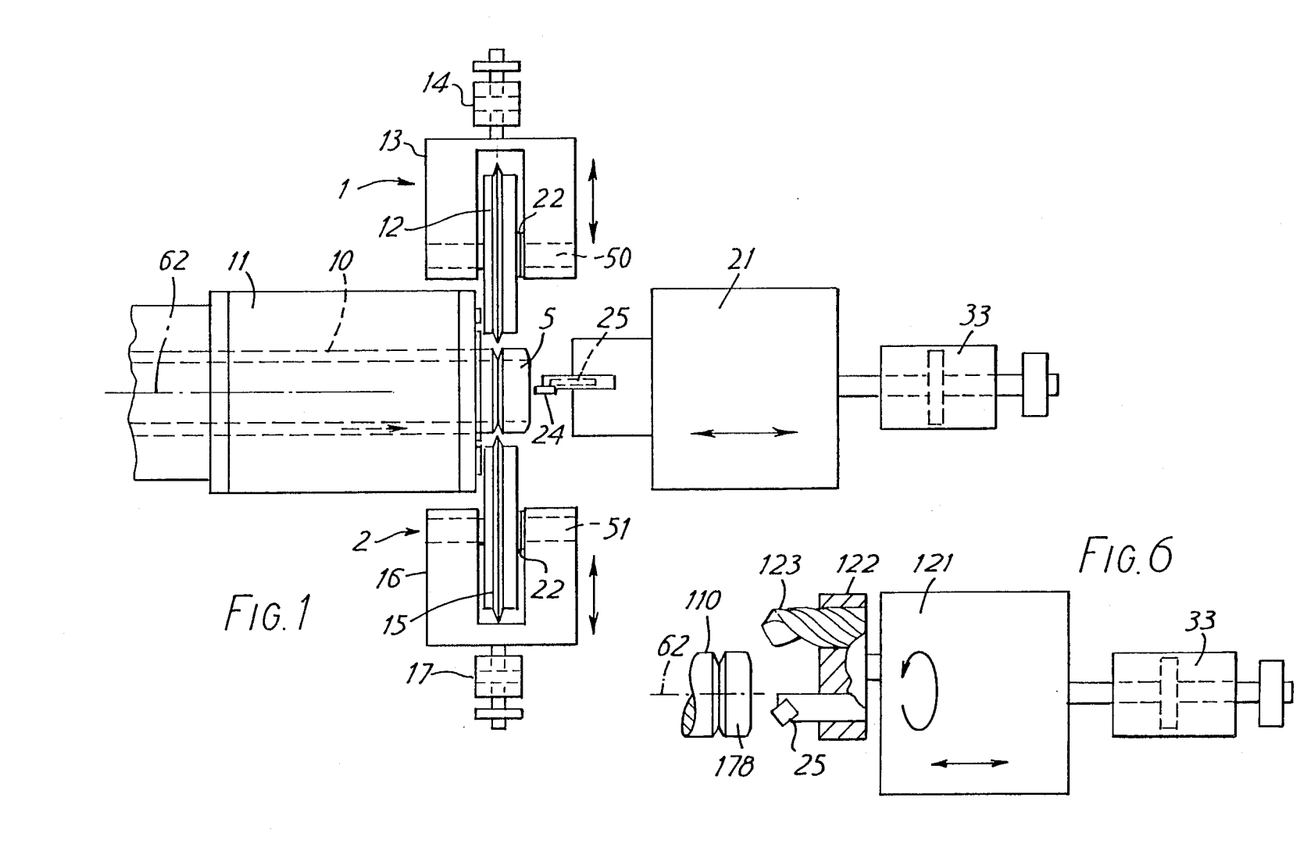
FIG. 1 is a much-simplified plan view of an apparatus of the kind hereinbefore specified, not according to this invention but substantially as described in our above-mentioned United Kingdom patent specification No. 1535562.
FIG. 6 is a much simplified plan view of a tailstock assembly, modified for incorporation in the apparatus of FIGS. 2 to 5 so as to enable the apparatus to work on bar stock.

The apparatus shown in FIG. 1, on the other hand, is a blank preparation machine for making a succession of annular workpieces or blanks 5, each having a cylindrical outer circumferential surface, from steel tube stock 10. Each of the blanks 5 is suitable for subsequent forming, in one or more separate machines, into a ring which may be generally similar to the ring 3 in FIG. 5.

Referring to FIG. 1, this prior art machine is of the single-spindle type and has a chuck 11 of the conventional collet type, for supporting the tube stock 10. The latter is cantilevered from the chuck 11 on a central axis 62. Adjacent to the chuck 11, and on either side of the tube stock 10 projecting therefrom, are two identical, diametrically-opposed tool heads 1, 2. Each tool head comprises a yoke, 13 and 16 respectively, which are movable radially towards and away from the central axis 62 by means of hydraulic actuators 14 and 17 respectively. Each yoke 13 or 16 has a respective transverse spindle or pin 50, 51 which carries a corresponding one of a pair of rotatable parting tool elements in the form of part-off rolling tools 12, 15 respectively. Each of the part-off rolling tools 12 and 15 is biassed by a disc spring or a Belleville washer 22 towards a left-hand or datum position from which it can be moved axially to the right (as seen in FIG. 1) against its spring 22 by a limited amount.

A tailstock or machining head 21 is provided opposite the chuck 11. The tailstock 21 is movable, towards and away from the latter in directions parallel to the axis 62, by means of an hydraulic actuator 33. The tailstock carries a cutting tool 24 to machine the outer circumferential surface of the ring 5, a boring tool (indicated at 25) to machine the bore of the ring, and a chamfering tool which is not visible.

Referring now to FIGS. 2 to 5, the profile rolling machine shown in these Figures, and now to be described, differs from that seen in FIG. 1 only in the construction of the tooling, and in the aspects of its operation resulting from these differences. Thus the profile rolling machine has the chuck 11 and the tailstock 21 with its actuator 33, though these two last-mentioned parts are not shown in FIGS. 2 to 5. The boring tool 25 is also present (see FIG. 5), but the tool 24 of FIG. 1 is absent from the profile rolling machine. The latter again has two tool heads, each comprising a yoke with a tool spindle or pin upon which the tool elements are mounted, and each having its yoke coupled to a tool head actuator (such as 14, 17, but not shown in FIGS. 2 to 5) in the same manner as is shown in FIG. 1. In FIGS. 2 to 5, the tool heads comprise a primary tool head 30 and a secondary tool head 32, the yoke or body of each tool head being denoted by the reference numeral 34 and its tool spindle by 36. The tool spindles define respective tool axes parallel to the central axis 62.

Mounted on the tool spindle 36 of the secondary tool head 32, and freely rotatable on the latter, is a unitary tool member 38 in the form of a profiled roller of hardened steel suitable for performing cold rolling operations. The unitary roller 38 has three distinct portions, which, reading from left to right in FIGS. 2 to 5, comprise a parting tool element 40, a profile rolling tool element 42, and a thrust flange 44. In cross-section the parting tool element 40 is V-shaped, terminating at its circumference in a relatively narrow, radiused edge 46. The angle subtended at the edge 46 by the frusto-conical flanks of the tool element 40 is, as can be seen, relatively small. The flank 47 of the element 40 adjacent to the rolling tool element 42 merges with the outer circumferential surface 48, constituting the profiled rolling tool surface, of the element 42.

The rolling tool surface 48 is in this example of generally arcuate cross-section for forming the surface 4 of the finished ring 5 (FIG. 5); as has been mentioned, the surface 4 is spherical in form. The surface 48, in turn, merges with a generally frusto-conical flank 52 of the thrust flange 44. The angle subtended between the frusto-conical flanks 47 and 52 and the radial plane containing the outer circumference of the flank concerned, is the same in both cases. This ensures that, in the finished ring 5, the conical end faces 6 of the latter shall be identical with each other. The diameter of the flange 44 may be the same as that of the parting tool element 40, though it is not essential that these diameters be exactly the same. The relationship between these two diameters and their relationship with the smallest, i.e. mid-plane, diameter of the rolling tool surface 48, is defined in accordance with the limitation on penetration of the parting tool edge 46 into the tube stock 10. This will become clear from the description hereinafter of the method of operation of the machine.

The unitary roller 38 is flanked by a bush 54 on one side and a bush 56 on the other. The bush 54 bears against one of the arms of the yoke 34 through a pair of disc springs (Belleville washers) 58, whilst the bush 56 similarly bears against the other arm of the yoke through a set 60 of further Belleville washers. In this manner the roller 38 (and particularly therefore the parting tool element 40) is mounted for limited axial movement, controlled by the resilience of the two sets of Belleville washers.

The primary tool head 30 has a unitary roller 64 which is identical to the corresponding roller 38 of the secondary head 32. The roller 64 is mounted diametrically opposite to the roller 38, so defining a common diametral plane 66 (FIG. 2) containing the respective edges 46 of the parting tool elements. For this purpose the roller 64 is again mounted on the corresponding tool spindle 36, for free rotation thereon, with another bush 56 and set 60 of Belleville washers between the roller and the right-hand arm of the corresponding yoke 34 as seen in FIGS. 2 to 5.

The unitary roller 64 is spaced from the other arm of the yoke by a further pair 58 of Belleville washers, a bush 68, a grooving tool 70, and an intermediate spacer bush 72. The grooving tool 70 comprises a disc-like wheel of hardened steel to serve as a cold rolling tool, and is of smaller diameter than the adjacent parting tool element 40. It has a V-shaped working surface 74, which subtends an angle at the outer circumference having any suitable value for the purpose to be described below. In this example this angle is 45°.

The spacer bush 72 of the primary tool head is accurately machined to a length such that the effective axial distance L, (FIG. 2), between the circumferential edge of the grooving tool 70 and the common plane 66 containing the edge 46 of the parting tool element, has a fixed predetermined value which is equal to, or which bears a known relationship to the final axial length (ring width) L' of the finished ring 3 (FIG. 5). The grooving tool 70 is freely rotatable on its tool spindle 36.

The chuck 11 has, associated with it, conventional means (not shown) for feeding cylindrical steel stock (in this example tube stock) 10 through it, along the central axis 62. This feeding means need not be described here; for a discussion of suitable feeding means reference is made to our aforementioned Patent Specification No. GB-2038213A. It is sufficient to mention here that the feeding means is adapted to index the stock 10 forward along the central axis 62 by increments approximately equal to the length L of the spacer bush 72, suitable stop means (not shown) being provided for halting the advance at the end of each increment.

The operation of the profile rolling machine will now be described. Through the cycle of operation to be described, the chuck 11 is rotated continuously by conventional drive means (not shown), so as also to rotate the tube stock 10 continuously. The stock 10 is advanced by an increment, as mentioned above, and is held by the chuck in the axial position shown in FIG. 2. In this position, it will be observed that a V-shaped locating groove 76, previously formed circumferentially on the outside of the stock 10, is intersected by the common plane 66 of the two parting tool elements 40. The annular end portion 78 of the stock 10, which extends from the centre of the locating groove 76 to the free end of the stock, has the same length L as the spacer bush 72. It is of course the end portion 78 which will now be formed into the profiled ring 3 seen in FIG. 5.

The hydraulic actuators of the tool heads 30, 32 are now operated so as to advance the tool heads simultaneously in radial directions towards the central axis 62, as indicated by the arrows R in FIG. 3. When the edges 46 of the parting tool elements 40 simultaneously reach the locating groove 76, upon continued radial movement the tool elements 40 become accurately located in the latter so that the common plane 66 then contains the bottom of the locating groove. The unitary rollers 38 and 60 may undergo slight axial movement, against the appropriate Belleville washers, in order to effect this adjustment. In the event of such axial movement, the grooving tool 70 undergoes the same movement, thus preserving, at this stage, the axial distance L between the tool 70 and the plane 66. This ensures that the new locating groove (indicated at 80 in FIG. 4), which is about to be made by the tool 70, shall be in exactly the correct axial position, so that the next end portion of the tube stock will be of exactly the same length as the end portion 78.

Upon continued radial movement of the tool heads, the parting tool elements 40 penetrate into the tube stock material, so forming a parting groove in the latter. This is accompanied by further axial movement, which is against the action of the Belleville washers 60, of the unitary rollers 38 and 64. This axial movement is illustrated in FIG. 3 by arrows A, whilst the original axial position of the secondary tool head 32, by way of example, is indicated in phantom lines. Such axial movement is due to the fact that the flank of each of the parting tool elements 40 which faces the chuck 11 is guided in the direction of the corresponding face of the parting groove. As a consequence of local deformation of the material of the stock 10 during the formation of the parting groove, the annular end portion 78 is urged axially forward as indicated by the arrow X in FIG. 3, until its free end engages the thrust flanks 52 of the unitary rollers.

It will be observed that the stage illustrated in FIG. 3 is that at which the free end of the end portion 78 is about to engage the flanks 52. At this stage neither the grooving tool 70 nor the profiled rolling tool surface 48 has yet engaged the tube stock, though both are about to. Consequently, the grooving tool 70 undergoes the same axial movement A as the roller 64; but this ceases to be so as soon as the tool 70 meets the stock 10. Thereafter, the tool 70 forms the second locating groove 80 in true radial movement, so that the continued radial movement of the parting tool element 40 causes the axial distance between it and the tool 70 to increase (as is seen from the gap shown in FIG. 4 between the latter and the spacer bush 72).

Whilst the second locating groove 80 is being formed, the end portion 78 is cold rolled between the two unitary rollers 38 and 64 so that its exterior surface is reformed to the cross-section shown in FIGS. 4 and 5 (and already described herein). This cold rolling operation is performed by the profiled surfaces 47, 48 and 52 of the unitary rollers.

The radial advance R of the tool heads is terminated when the profiled rolling operation has been completed, i.e. when the end portion 78 has a profile conforming with that of the abovementioned profiled surfaces of the unitary rollers. At this stage, illustrated in FIG. 4, the locating groove 80 is also complete, whilst the parting groove has been formed to a depth such that complete severance of the end portion 78 from the remainder of the tube stock has not quite been achieved.

The tool heads 30 and 32 are now radially retracted, and the boring tool 25 is introduced, as seen in FIG. 5, to machine the bore of the end portion 78 to the required diameter to form the bore 7 of the finished ring 3. This operation also completes severance of the ring 3 from the tube stock; in this connection it will be realised that the relationship between the diameter of the parting tool elements 40 and the location of the profiled rolling tool surface 48 will have been determined accordingly.

It should also be observed that the bead formed in the bore of the tube stock as a result of the formation of parting groove, and visible in FIGS. 3 to 5, is greatly exaggerated for clarity. This bead, like the burrs visible at the outer edges of the parting groove, contains only a very small quantity of metal. The bead is removed by the boring tool 25, and (with any other metal removed from the bore by the tool 25) represents the only material lost during the manufacture of the profiled ring 3. The material in the external burrs mentioned above is re-formed during the ring forming operation, and is not lost.

The finished ring 3 is removed by any suitable means (not shown), whereupon the machine is ready for the tube stock to be indexed axially forward once again for the making of the next ring.

As has been mentioned hereinbefore, the profiled rings 3 can be further operated on if necessary, by further cold rolling operations or by machining (for example to form chamfers on the ends of the bore).

It will be understood that the rollers 38 and 64 need not be of unitary construction. Any one or more of the elements 40, 42 or 44 may be made as a separate member. The profile of the finished rings, as defined by the rolling surfaces of the tool elements, may take any desired form. Furthermore, any suitable number of tool heads may be provided, for example three or more. Whilst it is generally convenient for there to be as many profiled rolling tool surfaces (such as the surfaces 48) as there are tool heads, this is not essential provided proper "back-up" support is provided. The same is true for the parting tool elements. In the latter case, our Patent Specification No. GB-2038213A describes an alternative arrangement in which there is a single parting tool which is carried by one tool head, with a simple back-up roll, radially opposite the parting tool provided as part of the other tool heads.

Similarly, it is not essential that the end stop means providing an axial thrust surface for the free end of the stock (represented by the surfaces 52 in the example shown in the drawings) should necessarily be a part of the rotating tool assembly, as for example the rollers 38 and 64. Thus for instance a fixed stop plate or ring could be mounted, in the axial position occupied by the flanges 44 in FIG. 4, between the two tool heads. Such a plate or ring will have a suitable aperture to permit the boring tool 25 to pass through it, and may be carried by the main frame of the machine.

Figure 11:
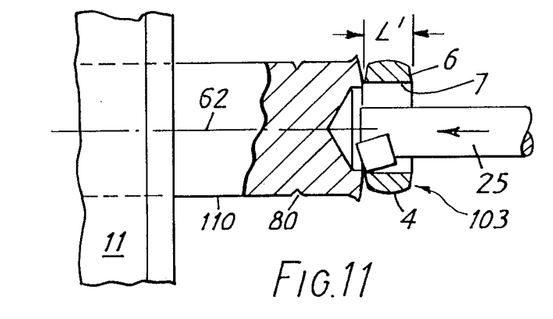
FIG. 11 shows the separation of the ring from the remainder of the bar stock.

Referring now to FIGS. 6 to 11, the method and apparatus therein illustrated are adapted for the substitution of solid bar stock 110 for the tube stock 10. In this case, as will be seen, the bore of the finished ring, 103 in FIG. 11, is formed by conventional drilling, which involves substantial loss of material. Nevertheless, this may be preferable on economic grounds to the use of tube stock where the ring 103 is to be of relatively small diameter.

The apparatus of FIGS. 6 to 11 is the same as that shown in FIGS. 2 to 5 except (a) insofar as any dimensions may require to be different in order to provide for a difference between the diameters of the tube stock 10 and bar stock 110, or any designed dimensional differences between the finished rings 3 and 103; and (b) insofar as the tailstock assembly shown in FIG. 6 differs from the equivalent part (illustrated in FIG. 1) of the apparatus for working on tube stock. In FIG. 6, the tailstock or machining head is indicated at 121; it differs from the tailstock 21 of FIG. 1 in having a turret 122 which carries, besides the boring tool 25, a drill 123. By suitable rotation of the turret 122, the drill 123 can be aligned with the central axis 62.

Figure 2:
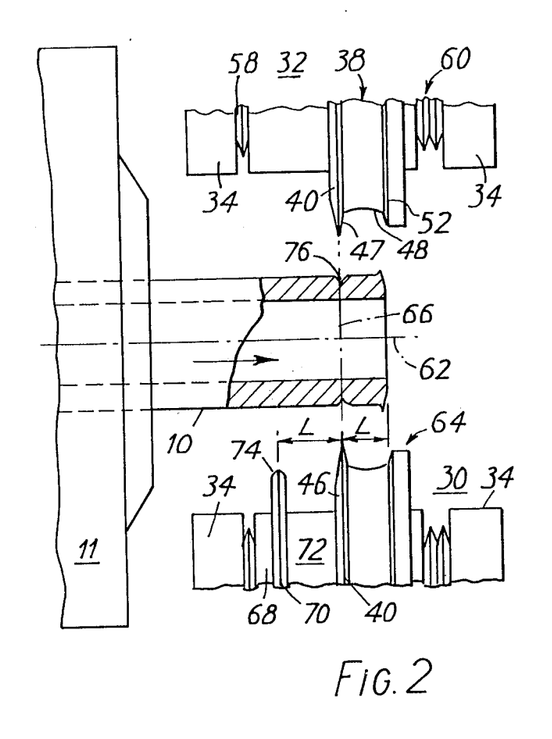
FIG. 2 is a simplified plan view, on a larger scale, showing that part of the apparatus, according to the present invention, which is to be described, that differs from the apparatus shown in FIG. 1.
Figure 7:
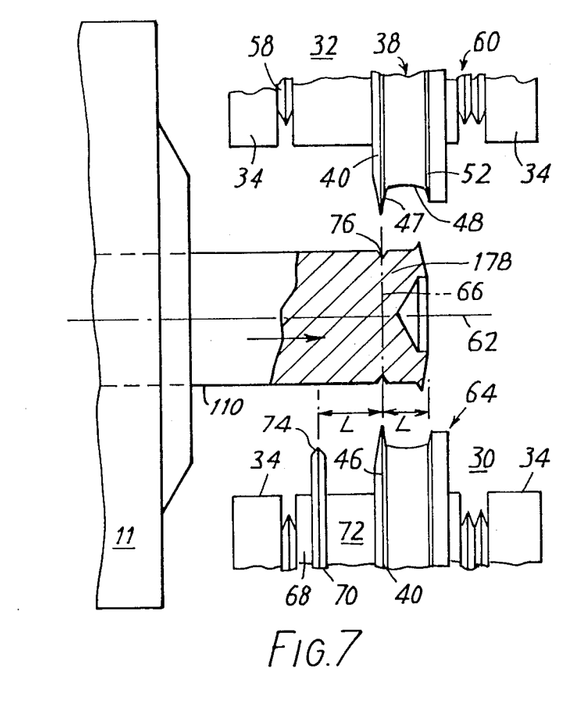
FIGS. 7, 8 and 9 are generally the same as FIGS. 2, 3 and 4 respectively except that the corresponding stages of manufacture are here shown in connection with making the profiled ring from bar stock.
Figure 8:
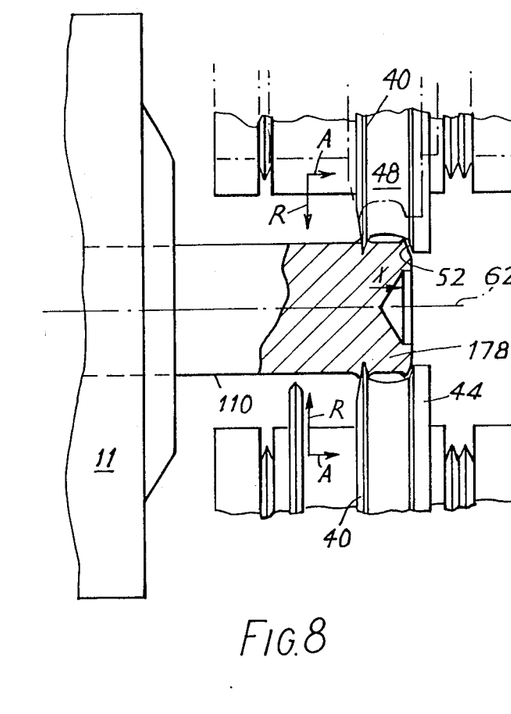
Figure 9:
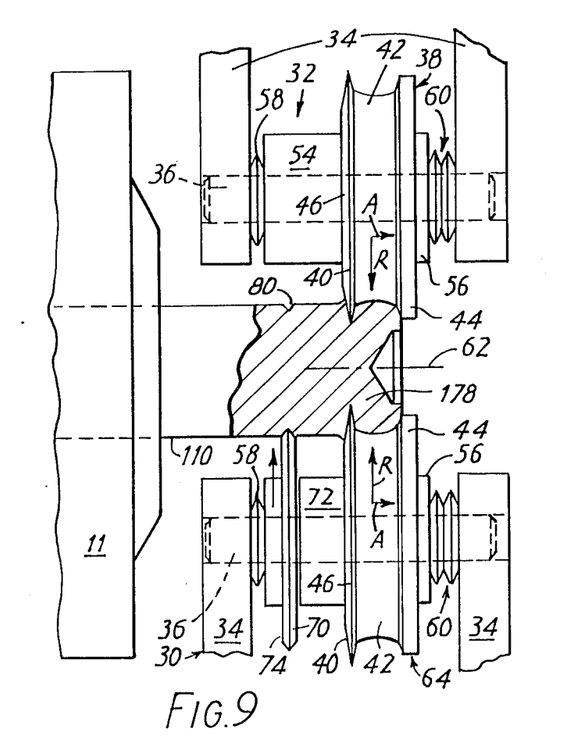
Figure 10:
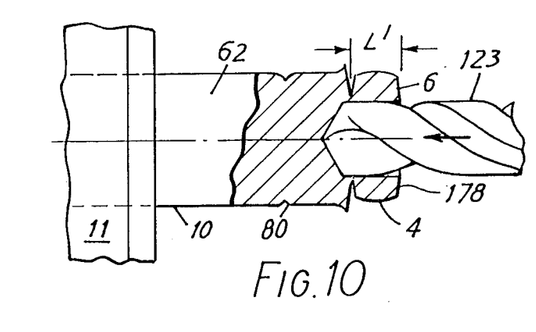
FIG. 10 shows the formation of a bore through the free end portion of the bar stock.

The operation illustrated in three of its stages in FIGS. 7, 8 and 9 is the same as that already described with reference to FIGS. 2 to 4 using tube stock except that they are performed on the solid bar 110. Thus, the radial advance R of the tool heads (and therefore of the parting tools 40) is terminated when the formation of the external profile of the end portion 178 of the bar stock 110 is complete, as is seen in FIG. 9. The tool heads 30 and 32 are now radially retracted, and the drill 123 is now introduced (see FIG. 10) so as to form a coaxial bore in the bar stock extending through the end portion 178.

It will be noticed that the depth of the parting groove formed by the tool elements 40 in this example, is insufficient for the drill 123 to effect final separation of the ring 103 from the bar stock; however, the tooling can if desired be so dimensioned that the drill will in fact effect such separation. In this example, the drill 123 is withdrawn, and after rotating the turret 122 (FIG. 6) appropriately, the boring tool 25 is introduced (FIG. 11) to effect final separation in the same manner as was shown in FIG. 5.

The formation of a bore by drill 123 may if desired be performed before the tool heads 30 and 32 are advanced for forming the parting groove and the second locating groove 80.

I claim:

1. A method of making a succession of rings from cylindrical tube or bar stock having a free end comprising:
   (1) supporting the stock on its axis and effecting relative rotation about said axis as between the stock and a rolling tool member capable of limited controllable axial movement, the tool member having a profiled tool surface for engaging and cold rolling the outer circumferential surface of an end portion of the stock terminating at said free end, said tool surface including an end stop portion for abutting said free end and a profiled parting portion for cold rolling a circumferential parting groove in the stock at the other end of the end portion, while
   (2) advancing the tool member into simultaneous endwise and circumferential engagement with the stock, and then continuing said advance to form the parting groove, whereby the same tool member forms simultaneously therewith, on substantially the whole external surface of the end portion, a positively rolled predetermined profile by cold rolling;
   (3) halting the said advance when the end portion is nearly but not quite severed from the stock;
   (4) subsequently completing severance of the end portion to constitute a said ring;
   (5) radially retracting the tool member when it has finished operating on the stock; and
   (6) axially feeding the stock forward by a predetermined amount ready for making the next ring.

2. A method according to claim 1 including partially forming the parting groove before the commencement of engagement of the rolling tool surface with the outer circumferential surface of the end portion the parting portion of the tool urging the end portion axially forward until its free end engages the end stop portion.

3. A method according to claim 1, when performed on bar stock, including the step of forming subsequent to step (1), an axial bore through the end portion of the stock.

4. A method according to claims 1, 2 or 3 wherein step (4) comprises machining the bore of the unsevered end portion to its required diameter.

5. A method according to claim 2, wherein a grooving tool is advanced toward the stock simultaneously with the rolling tool member, to form on the stock a substantially V-shaped, circumferential locating groove spaced axially from the parting groove by a predetermined distance, with the parting groove lying between the locating groove and the free end, the stock in step (6) being fed forward by an amount approximately equal to said predetermined distance so that the locating groove lies opposite the parting tool element, the latter being guided by the locating groove, at the commencement of its next advance into the stock, so as to be in exact register with the locating groove.

6. A method according to claim 5, wherein the initial engagement of the grooving tool with the stock takes place no earlier than the engagement of the free end of the stock with the end stop surface.

7. Apparatus for making a succession of rings from cylindrical tube or bar stock having a free end, comprising:
   stock support means defining a central axis, for supporting said stock protruding therefrom on said axis;
   a rolling tool member having a profiled tool surface, for cold rolling the external surface of an end portion of the stock terminating at said free end, and including an end stop portion for abutting said free end, an intermediate surface portion contiguous with said end stop portion for cold rolling the outer circumferential surface of said end portion, and a parting portion contiguous with said intermediate surface portion for cold rolling a circumferential parting groove in the stock;
   tool support means mounting said tool member;
   tool member advancing means for moving said tool support means towards and away from said central axis to cold roll the outer circumferential surface of the end portion;
   means mounting the tool member on said tool support means for limited, controllable axial movement relative to the tool support means;
   means coupled with a said support means for effecting relative rotation about said central axis as between the tool support means and the stock support means, and thereby between the tool member and the stock;
   means associated with said tool support means for advancing the stock axially by successive predetermined increments; and
   means for completing the severance of said end portion from the stock at said parting groove.

8. Apparatus according to claim 7, having a plurality of said rolling tool elements disposed around the central axis and movable together for simultaneous operation on the end portion of the tube stock.

9. Apparatus according to claim 7, wherein the parting tool portion is of such radial depth as to engage said stock and begin to form said parting groove before said intermediate surface engages the stock, the parting tool portion being so profiled as to guide the tool member axially so as to bring the end stop portion into abutment with said free end before said intermediate surface engages the stock.

10. Apparatus according to claim 7, further comprising a grooving tool member defining a common tool axis with said rolling tool member, said grooving tool member being carried by said tool support means and being freely rotatable about said common tool axis, the grooving tool member being separated by a predetermined axial distance from the rolling tool member on the side of the latter remote from the parting portion of the rolling tool member, said support means further comprising means for permitting limited axial movement of each of said tool member with respect to the stock support means, the grooving tool member having a working surface with a substantially V-shaped profile.

11. Apparatus according to claim 10, wherein the grooving tool element has a diameter greater than the smallest diameter of the tool surface of the rolling tool element, and substantially smaller than the diameter of the parting portion.

12. A method for making rings from cylindrical stock comprising:
supporting and axially rotating the stock to present a free end
advancing a tool member radially into engagement with the stock, the tool member having a profiled tool surface for cold rolling the outer circumferential surface of an end portion of the stock terminating at the free end, the tool surface including,
an end stop portion for abutting the free end, and
a profiled parting portion for cold rolling a circumferential parting groove in the end portion opposite the free end, advance on the tool member causing the profiled parting portion to urge the end portion axially against the end stop portion, form a parting groove and a predetermined profile on said outer circumferential surface;
halting the said advance when the end the said advance when the end portion is nearly but not quite severed from the stock;
subsequently completing severance of the end portion to constitute a said ring;
radially retracting the tool member when it has finished operating on the stock; and
axially feeding the stock forward by a predetermined amount ready for making the next ring.

* * * * *